(12) United States Patent
Delzeit

(10) Patent No.: US 6,858,197 B1
(45) Date of Patent: Feb. 22, 2005

(54) CONTROLLED PATTERNING AND GROWTH OF SINGLE WALL AND MULTI-WALL CARBON NANOTUBES

(75) Inventor: Lance D. Delzeit, Sunnyvale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/099,247

(22) Filed: Mar. 13, 2002

(51) Int. Cl.$^7$ .................................................. D01F 9/12
(52) U.S. Cl. ................................ 423/447.3; 423/447.1; 423/445 R
(58) Field of Search ....................... 423/447.1, 447.3, 423/445 R

(56) References Cited

U.S. PATENT DOCUMENTS

| | | | | |
|---|---|---|---|---|
| 5,973,444 A | * | 10/1999 | Xu et al. | 313/309 |
| 6,277,318 B1 | | 8/2001 | Bower et al. | |
| 6,331,209 B1 | | 12/2001 | Jang et al. | |
| 6,333,016 B1 | | 12/2001 | Resasco et al. | |
| 6,514,113 B1 | * | 2/2003 | Lee et al. | 445/50 |
| 2002/0025374 A1 | * | 2/2002 | Lee et al. | 427/230 |
| 2003/0044519 A1 | * | 3/2003 | Takai | 427/77 |

OTHER PUBLICATIONS

Fan et al. "Self–Oriented Regular Arrays of Carbon Nanotubes and THeir Field Emission Properties", Jan. 22, 1999. Sci nce col. 283, pp. 512–514.*

Cassell et al. "Combinatorial Optimization of Heterogeneous Catalysts Used in the Growth of Carbon Nanotubes", Nov. 18, 2000, Langmuir vol. 17, pp. 260–264.*

Su et al. "Lattice–Oriented Growth of Single–Walled Carbon Nanotubes" Jul. 20, 2000, Journal of Physical Chemistry B vol. 104 No. 28, pp. 6505–6508.*

Iijima, S., "Helical Microtubes Of Graphitic Carbon", Letters to Nature, vol. 354, pp. 56–58 (Nov. 1991).

* cited by examiner

*Primary Examiner*—Stuart L. Hendrickson
*Assistant Examiner*—Peter J Lish
(74) *Attorney, Agent, or Firm*—Robert M. Padilla; John F. Schipper

(57) ABSTRACT

Method and system for producing a selected pattern or array of at least one of a single wall nanotube and/or a multi-wall nanotube containing primarily carbon. A substrate is coated with a first layer (optional) of a first selected metal (e.g., Al and/or Ir) and with a second layer of a catalyst (e.g., Fe, Co, Ni and/or Mo), having selected first and second layer thicknesses provided by ion sputtering, arc discharge, laser ablation, evaporation or CVD. The first layer and/or the second layer may be formed in a desired non-uniform pattern, using a mask with suitable aperture(s), to promote growth of carbon nanotubes in a corresponding pattern. A selected heated feed gas (primarily $CH_4$ or $C_2H_n$ with n=2 and/or 4) is passed over the coated substrate and forms primarily single wall nanotubes or multiple wall nanotubes, depending upon the selected feed gas and its temperature. Nanofibers, as well as single wall and multi-wall nanotubes, are produced using plasma-aided growth from the second (catalyst) layer. An overcoating of a selected metal or alloy can be deposited, over the second layer, to provide a coating for the carbon nanotubes grown in this manner.

21 Claims, 14 Drawing Sheets

US 6,858,197 B1

CONTROLLED PATTERNING AND GROWTH OF SINGLE WALL AND MULTI-WALL CARBON NANOTUBES

FIELD OF THE INVENTION

This invention relates to controlled deposition of catalysts for growth of carbon nanotubes.

BACKGROUND OF THE INVENTION

In 1991, S. Iijima (Nature, vol. 354 pp. 56–58) reported growth of multi-wall coaxial nanotubes, containing 2–50 layers with radial separations of about 0.34 nm, using an arc discharge evaporation method similar to that used for Fullerene synthesis. The nanotubes originally observed by Iijima were formed on the negative voltage end of a carbon electrode and were plentiful in some regions and sparse in other regions. Since that time, other workers have developed other discharge means for controlled deposition of graphitic carbon. However, it is not straightforward to discriminate between, and control the growth of, a single wall nanotube ("SWNT"), a multi-wall nanotube ("MWNT") and/or a nanofiber ("NF").

The SWNTs, MWNTs and NFs potentially have many applications that rely upon the large mechanical strength and/or large electrical conductivity associated with these structures, if the patterning of such structures can be controlled. Some workers have used liquid catalysts to initiate growth of some carbon nanotubes, but patterning of a finely detailed array of such structures is difficult or impossible using a liquid.

What is needed is a system and procedure that allows one to controllably deposit a catalyst pattern to initiate growth of an array of SWNTs, an array of MWNTs, or an array of NFs, with firm control of shapes and dimensions of the regions where such carbon nanotubes are grown.

SUMMARY OF THE INVENTION

These needs are met by the invention, which provides (1) separate procedures for generating and controlling patterns of growth of an array of SWNTs, an array of MWNTs and/or an array of NFs, with a carbon nanotube length that depends upon the structure involved. In one embodiment, an array of SWNTs is grown by providing a substrate coated with an optional first thickness (preferably at least 1–10 nm) of a metal underlayer (e.g., Al or Ir or a mixture thereof) and with a second thickness (preferably at least 0.1–5 nm) of one or more active catalysts (e.g., Fe, Co, Ni and/or Mo, or a mixture thereof) and passing a selected heated hydrocarbon gas (e.g., $CH_4$, $C_2H_4$, and/or $C_2H_2$) intermediate species ($C_mH_n$) over the coated substrate to successively strip the H atoms and deposit the carbon particles on the catalyst. Optionally, the underlayer includes a first sub-underlayer and a second sub-underlayer with different materials. For an SWNT array, the preferred gas is $CH_4$ and the preferred temperature range is 800–1100° C. (preferably, T≈900° C.) For an MWNT array, the preferred gas is $C_2H_4$ or $C_2H_2$, the preferred temperature range is 650–900° C. (preferably, T≈750° C.), and the Al or Ir underlayer is present. For an NF array, a plasma discharge can be used to grow NFs at T=400–900° C. (preferably, T≈400–700° C.). A selected pattern for the metal sub-layers on the substrate, or of catalyst on the substrate coated with the metal sub-layer, is formed, using an apertured mask, and the carbon nanotubes are grown in the selected pattern. Size of the pattern can be as small as 20 nm, if electron beam lithography is used to define the pattern.

DESCRIPTION OF BEST MODES OF THE INVENTION

Figure 1:
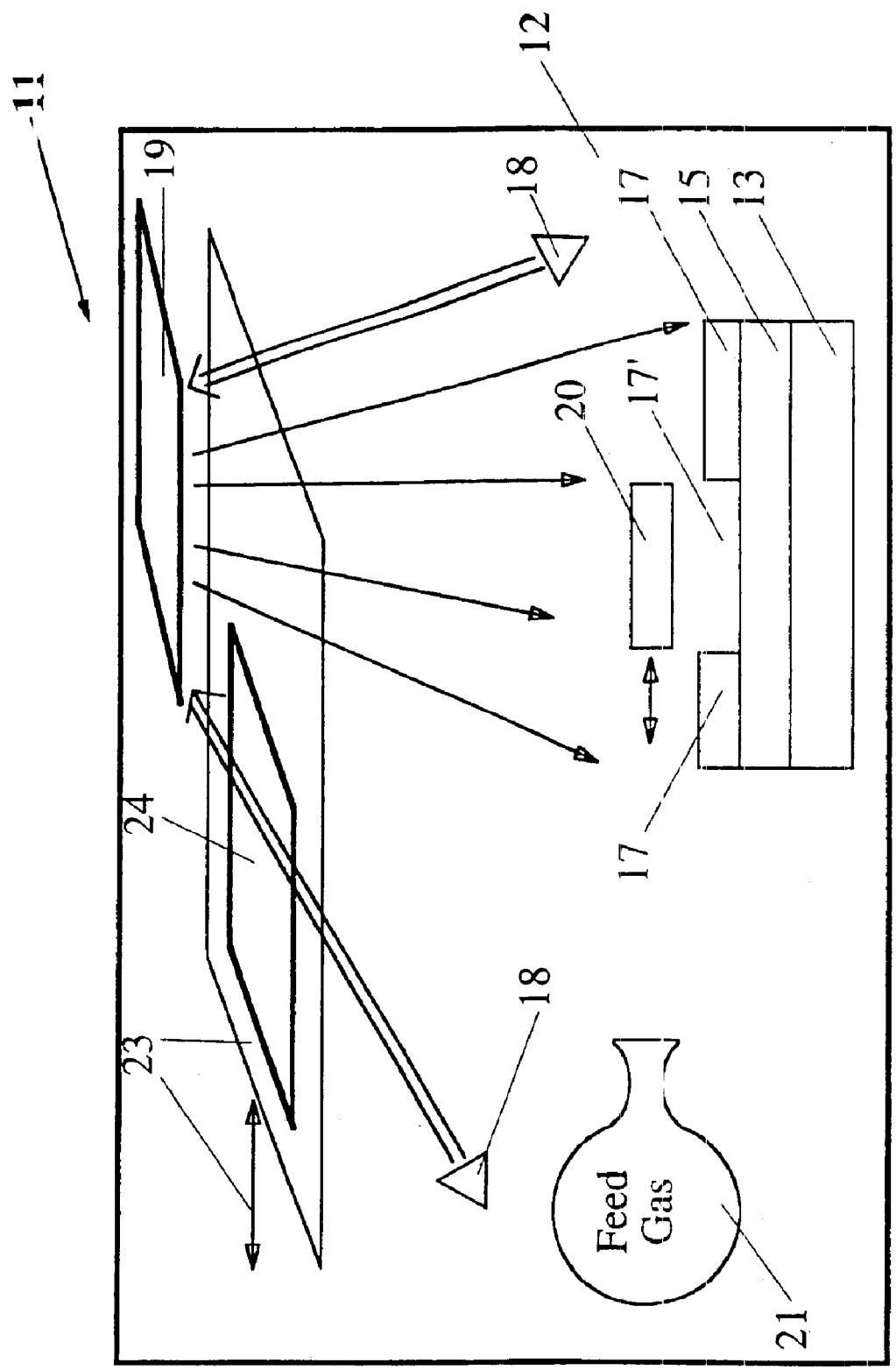
FIG. 1 illustrates a systems for generating and controlling the growth of an SWNT or an MWNT, depending upon the choice of several parameters.

FIG. 1 illustrates a system 11 for generating and controlling patterned growth of an array of SWNTs. A substrate 13 located in a chamber 12 is coated with a first layer 15 (optional) of a selected first metal, preferably Al and/or Ir, having a thickness of at least 1–10 nm (for Al) or 5–20 nm (for Ir). A thicker first layer can be used but does not produce any significant changes in the array thus produced. Optionally, the first layer 15 has a multi-layer structure, including a first sub-layer 15A of a metal or alloy, such as Pt, Pd, Cr, Mo, Ti and/or W, that has selected electrical conductivity properties, and a second sub-layer 15B, preferably Al (thickness ≧1–10 nm) or Ir (thickness ≧5–20 nm), that provides a structure for a catalyst layer 17. Use of a second sub-layer 15B also allows growth of SWNTs, MWNTs and NFs on a (coated) substrate that is not compatible with the catalyst. An example is use of highly oriented pyrolytic graphite (HOPG) or amorphous carbon on the substrate. For convenient reference, the optional first layer 15 will be referred to as the "first layer," whether the structure is single-layer or multi-layer, except where details of this layer are important.

One or more ion sources 18 provide ion beams that are directed at a metal sputtering source 19 that produces particles of a selected metal, such as Fe, Co or Ni, that forms a catalyst layer 17, having a preferred thickness of 0.1–20 nm, on the first layer 15. Two or more metals can be deposited simultaneously or sequentially as part of the first layer 15 and/or the second layer 17, using a sputtering source.

If the support structure 13/15/17 is to promote a patterned array of carbon nanotubes, a mask 20 is positioned between the sputtering source 19 and the first layer 15 to prevent the catalyst layer 17 from forming at selected locations. The mask 20 creates a "shadow" on the first layer 15, preventing the catalyst layer 17 from forming and producing a "void" 17' where the catalyst material would otherwise appear.

The mask 20 can be a shadow mask that is positioned over the substrate 13 (or over the substrate 13 plus first layer 15)

by the adherence of molecules to the substrate surface, with selected regions of the adherence molecules removed, as occurs with photolithography and e-beam lithography; or by the addition of other self-assembling molecules, such as proteins or lipid layers or small metal particles held in place within a biological or chemical molecule and positioned onto a surface in a two-dimensional array.

A second layer 17 thicker than 0.1–20 nm may be used here. The active catalyst may include a co-catalyst, such as a small amount of Mo in addition to the Fe, Co and/or Ni, or a mixture thereof, especially in the absence of an Al first layer 15, in order to promote a higher density of the SWNTs in the array. The first layer 15 catalyzes the required chemical reaction(s) and may be deposited using ion beam sputtering from a first layer source 19 located adjacent to the substrate 13. The substrate may be Si, porous Si, amorphous carbon, highly oriented pyrolytic graphite (HOPG), an AFM cantilever, fused quartz, zeolite, mica, selected ceramics, selected polymers, selected metals, natural minerals or any similar material. Provision of the first layer 15 enhances electrical conductivity associated with the carbon nanotube and also helps prevent lift-off of the catalyst in the second layer 17 from the substrate 13.

In one approach, a pattern including one or more catalysts in the second layer 17 is deposited in one chamber, and the system 11 is moved to a second chamber for growth of the carbon nanotubes. In another approach, catalyst deposit and patterned carbon nanotube growth occur in the same chamber.

A feed gas source 21 within the chamber 12 (e.g., a quartz tube) provides a heated gas, such as $CH_4$ at a temperature in the range T=800–1100° C., at a selected gas flow rate, such as 1000 sccm. A relatively inert carrier gas, such as Ar or Xe or Kr or $N_2$, is optionally used to transport the heated gas across the coated support structure 13/15/17, and the coated support structure successively strips the hydrogen atoms from the heated gas to ultimately produce C particles (bare C atoms and C molecules, etc.) that are received at, and accumulate on, a portion of the coated substrate and contribute to the growth of SWNTs, according to the catalyst pattern deposited on the substrate. If the heated gas temperature adjacent to the coated support structure 13/15/17 drops substantially below T=800° C., for example, to T≈750° C., the growth of SWNTs will stop. The gas $CH_4$ requires use of a relatively high temperature (T=800–1100° C.) in order to promote H atom stripping to produce substantially "bare" C atoms and molecules. The chamber temperature is then dropped to or below T≈300° C. before the coated substrate and SWNT growth array are exposed to air.

A shutter or similar mechanism 23 and aperture 24 are positioned between the sputtering source 19 and the feed gas source 21. The shutter 23 is opened and the mask 20 is positioned when the sputtering source 19 is to be used to deposit a first layer 15 or second layer 17 of material on the substrate 13 for purposes of subsequent growth of carbon nanotubes. When this deposit has ended and the feed gas is to be admitted into the chamber 12, the shutter 23 is closed, and the guns 18 and mask 20 are removed or hidden, to protect the sputtering source and mask surfaces from deposit of carbon thereon.

Provision of a first layer 15 allows deposit of a second layer that would otherwise be chemically inconsistent with, or be poisoned by, the underlying substrate or first sub-layer. Provision of the first layer, or of a sequence of sub-layers for the first layer, can also modify the electrical conductivity properties of the finished carbon nanotube array.

If the first layer 15 is omitted, the second layer thickness is no more than about 1 nm and the substrate surface is free of scratches and similar imperfections, no SWNTs will form on the substrate coated (only) with the second layer 17. If the substrate 13 has some scratches or imperfections in a given region, a few isolated SWNTs may grow there, even if the first layer 15 is absent. Adding the first coating layer 15, with a first layer thickness of at least 0.1 nm of Ir or of at least 0.1 nm of Al or a mixture thereof to the substrate 13, increases the density and the uniformity of growth of the SWNTs thereon. Addition of a small amount of Mo (≈0.2 nm) to the second layer 17 as a co-catalyst will increase the density of SWNTs, where the first layer includes Ir, and has no noticeable effect on density, where the first layer contains only Al. The density of SWNTs can be controlled and ranges from isolated SWNTs, to a discrete uniform array, to discrete thick ropes, to a dense matte of SWNT ropes.

Figure 3:
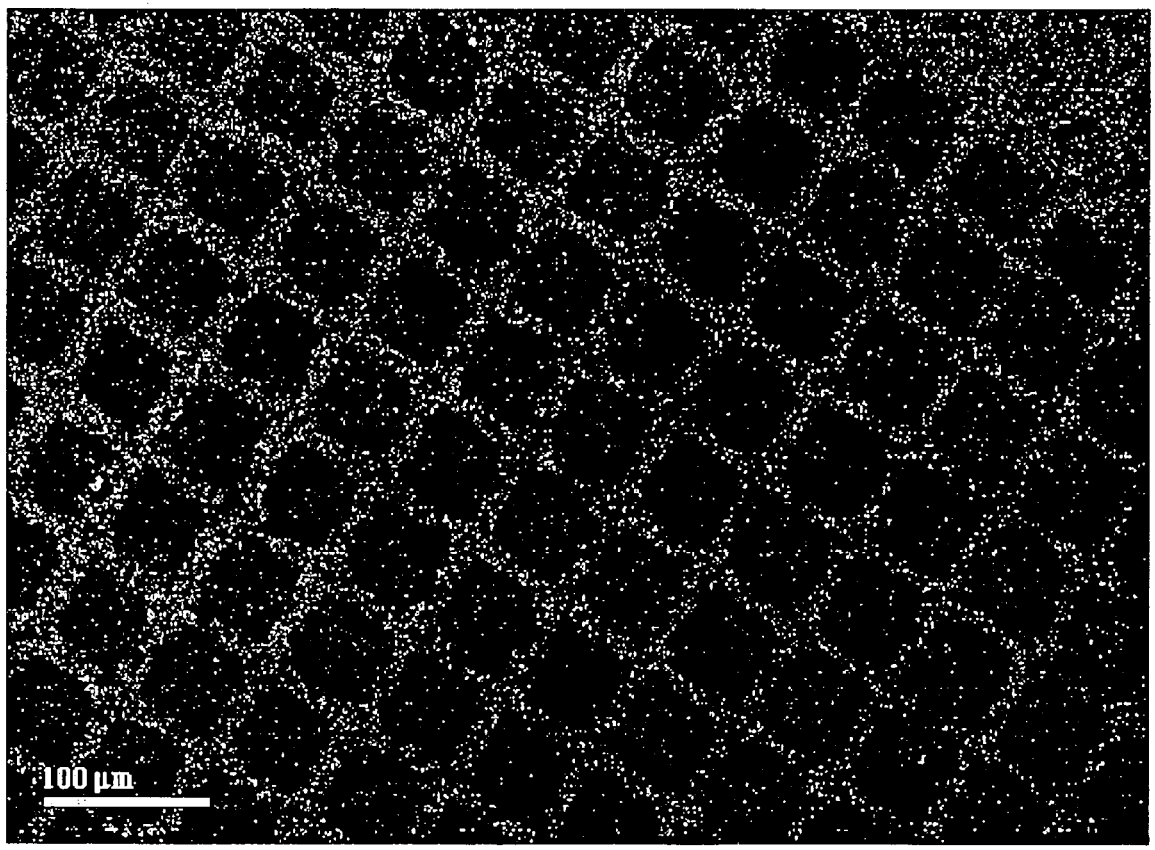
FIGS. 3 and 9A–9C are photomicrographic images of masked NT growth.

The pattern of SWNTs thus grown is determined by the pattern of the catalyst(s) deposited on the substrate coated with the first layer. The catalyst(s) can be deposited using ion sputtering on an Al or Ir source or can be deposited using arc discharge of a source, laser ablation of a source, chemical vapor deposition (CVD) from a suitable source, or a suitable metal evaporation method. The catalyst can be patterned using a mask with suitably detailed apertures that is pressed against the substrate 13, to provide a first layer pattern, and/or against the first layer 15, to provide a second layer pattern, before the next layer is formed. The mask pattern may be a regular or irregular array of polygonal or curvilinear apertures, such as those shown in a photomicrograph in FIG. 3 for SWNT growth.

Figure 2A:
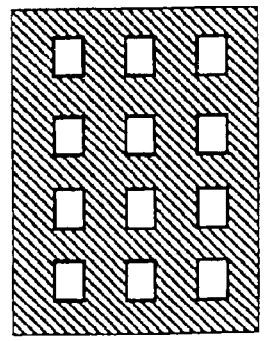
FIGS. 2A–2K illustrate some mask patterns for SWNT, MWNT and NF carbon nanotubes.
Figure 2B:
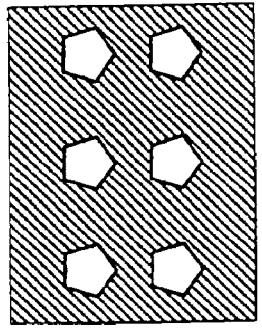
Figure 2C:
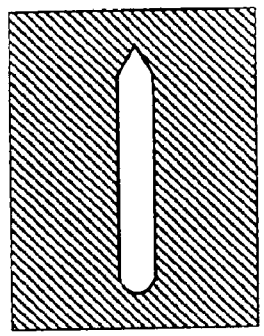
Figure 2D:
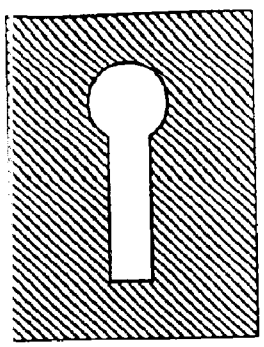
Figure 2E:
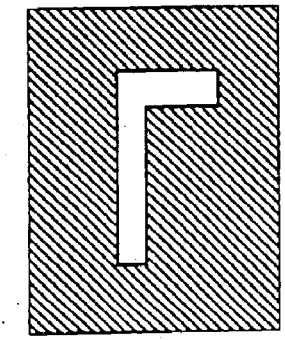
Figure 2F:
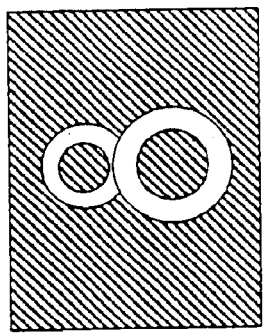
Figure 2G:
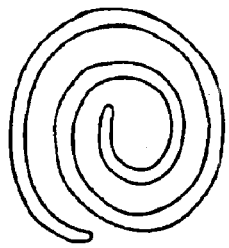
Figure 2H:
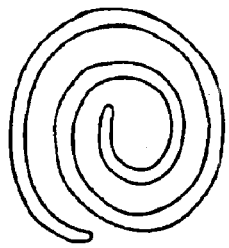
Figure 2I:
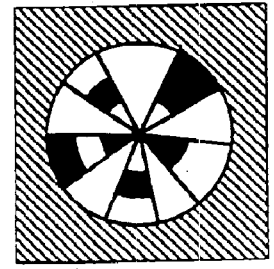
Figure 2J:
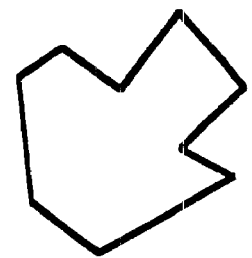
Figure 2K:

FIGS. 2A–2K illustrate some aperture patterns that may be used to control the regions where SWNTs, MWNTs and/or NFs are grown. The catalyst(s) is preferably provided using ion beam sputtering, arch discharge, laser ablation or evaporation, with a suitably apertured mask. FIGS. 2A and 2B illustrate regular arrays of rectangular and polygonal patterns. FIGS. 2C and 2D illustrate long rod-shaped apertures with particular shapes (semicircular, triangular, full circle) at one or both ends. FIGS. 2E, 2F and 2G illustrate apertures in the form of selected letters and numerals (here, "L", "Y" and "8"). FIG. 2H illustrates a few cycles of a spiral aperture. FIG. 2I illustrates a circle or oval with selected sectors as apertures. FIGS. 2J and 2K illustrate irregular patterns involving linear and curvilinear boundary segments.

The diameter of SWNTs varies from 0.9 to 2.7 nm (more generally, from 0.5 to 5 nm), and most NTs have a diameter of about 1.3 nm. In a growth of one array of 48 SWNTs, the diameter distribution was found to be about 10 percent at 0.9 nm, 44 percent at 1.3 nm, 29 percent at 1.8 nm, 10 percent at 2.2 nm and 6 percent at 2.7 nm. The length of an SWNT is difficult to determine, because most SWNTs do not have sufficient strength to support a substantial, vertically oriented tower (perpendicular to the local plane of the substrate).

Figure 4:
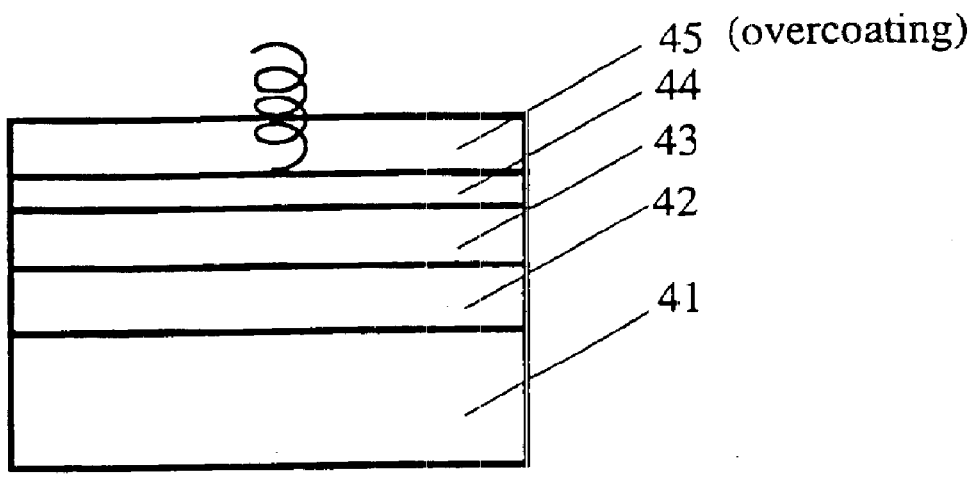
FIG. 4 schematically illustrates a four-layer structure, used to grow coated SWNTs.

FIG. 4 schematically illustrates a five-layer support structure 40 that can also be used to grow SWNTs. The structure 40 includes a substrate 41, a bottom layer 42 of Al (thickness ≧5 nm), a second layer 43 of Fe or Co or Ni (thickness ≧10 nm), a third layer 44 of Mo (thickness ≧0.2 nm) and a fourth layer 45 of Al (thickness ≧5 nm). Where an SWNT is grown from the support structure 40, a portion or all of the carbon nanotube is often coated with Al. This indicates that, by providing an overcoating for a more standard four-layer structure (41/42/43/44) and choosing the overcoating material to be compatible with the growth process, coated carbon nanotubes can be grown. Overcoating materials that appear to be compatible with carbon include Al, Ga, In, Tl, Au, Ag, Zn and/or Cd.

Figure 5:
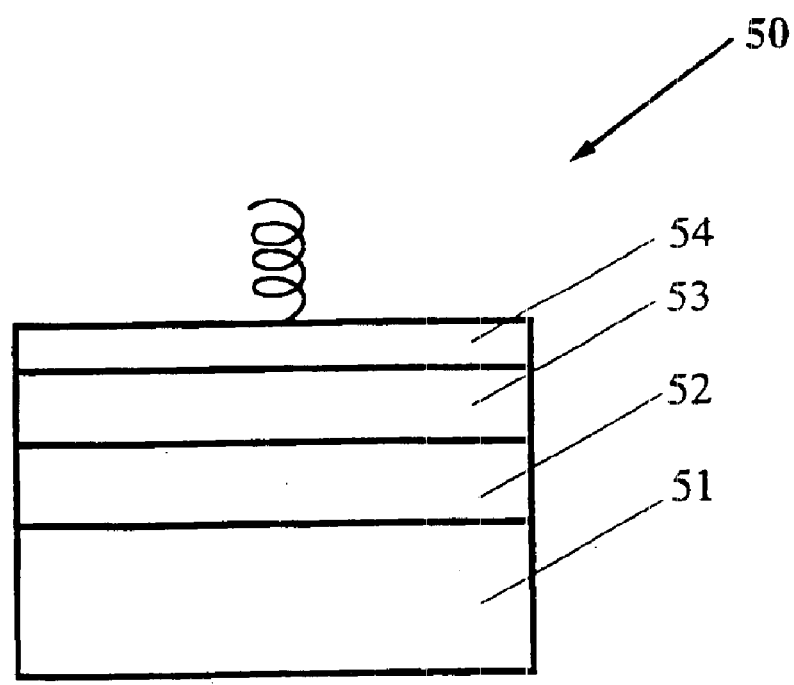
FIG. 5 schematically illustrates a structure having one, two or three layers, used to grow SWNTs.

FIG. 5 schematically illustrates a structure 50 for growing carbon nanotubes, having a substrate 51, a first layer 52 of Pt, Pd, Cr, Mo, Ti and/or W or a material with similar structure, a second layer of Al or Ir and a third layer 53 of Fe, Co or Ni (thickness 0.1–20 nm). Where the structure 51 has the composition Pt/Al/Fe, the measured resistance of an NF array on this structure is as low as 30 Ohms. Provision of a metal under-layer, such as Pt, Pd, Cr, Mo, Ti and/or W, dramatically lowers the electrical resistance associated with the NF grown on such a structure.

Where a corresponding structure having one layer 52 or two layers, 52 and 53, each of thickness $\geq$10 nm, on a substrate 51 is provided, as shown schematically in FIG. 5, the measured electrical resistance is much higher. Table 1 sets forth some one-layer, two-layer and three-layer structures, each layer having thickness 10 nm, and the estimated electrical resistances across a 5 mm distance of the NF array.

TABLE 1

Electrical Resistance Associated With An NF Structure

| Underlying Structure | Resistance (Ohms) |
| --- | --- |
| Pt/Al/Fe | 30 |
| Pt/Fe | 50 |
| Ti/Fe | 500 |
| Al/Fe | 1,000 |
| Fe | 10,000 |

Table 1 illustrates the dramatic reduction in electrical resistance that results from provision of an underlayer of a metal or alloy, such as Pt, Pd, Cr, Mo, Ti and/or W, as part of the growth structure for an NF array (with similar results being obtained for SWNTs and MWNTs).

The system 11 in FIG. 1 can also be used to generate and control the growth of a patterned array of SWNTs and MWNTs. For MWNTs and NFs, presence of a metal underlayer 15 is not required, but may be included. The ha substrate 13 located in the chamber 14 is optionally coated with a first layer 15 of a selected first metal, preferably Al and/or Ir, having a thickness of at least 5–20 nm. The substrate 13 and optional first layer 15 are coated with a second layer 17 of a selected catalyst, such as Fe, Co and/or Ni, having a thickness of 0.1–20 nm in a desired pattern. A thicker second layer 17 may be used here. Optionally, the active catalyst may include a co-catalyst, such as a small amount of Mo in addition to the Fe, Co and/or Ni. The first layer 15, if present, may be deposited using ion beam sputtering from a first layer source 39 located adjacent to the substrate 13, or using arc discharge, laser ablation, CVD or evaporation. The catalyst(s) in the third layer 17 is preferably provided using ion beam sputtering, arc discharge or laser ablation with a suitable catalyst source and a suitably apertured mask.

A source 21 within the chamber 14 provides a heated gas, preferably $C_2H_n$ with n=2 or 4 at a temperature in the range T=650–900° C. The heated gas moves across the coated substrate 13/15/17, which successively strips the hydrogen atoms from the heated gas to ultimately produce C particles (C atoms, C=C molecules, etc.) that are received at, and accumulate on, a portion of the coated substrate and contribute to the patterned growth of MWNTs. If the heated gas temperature drops substantially below T=650° C., for example, to T$\approx$600° C., the growth of MWNTs will stop. The gas $C_2H_4$ allows use of a somewhat lower temperature (T=650–900° C.) in order to promote H atom stripping to produce C particles.

A mask in the form of a 400 mesh grid can be positioned on the coated substrate 13/15/17, and MWNTs or SWNTs can be grown (only) in the exposed regions (50 $\mu$m×50 $\mu$m with 10 $\mu$m grid widths, in one experiment) not covered by the grid, with sharp transitions between the exposed and masked regions, as shown in photomicrographs in FIG. 3 and FIGS. 9A–9C. Alternatively, the mask may be formed using electron beam lithography, which allows formation of sharply defined apertures on a suitable substrate, with diameters as low as 20 nm, with an increase in available pattern detail. It is estimated that as many as 4×10$^6$ SWNTs or MWNTs will grow in a 50 $\mu$m×50 $\mu$m growth region, using hexagonal close packing and assuming a diameter of 20 nm, and that 1–4 SWNTs or MWNTs will grow in a 20 nm×20 nm growth region.

Figure 6A:
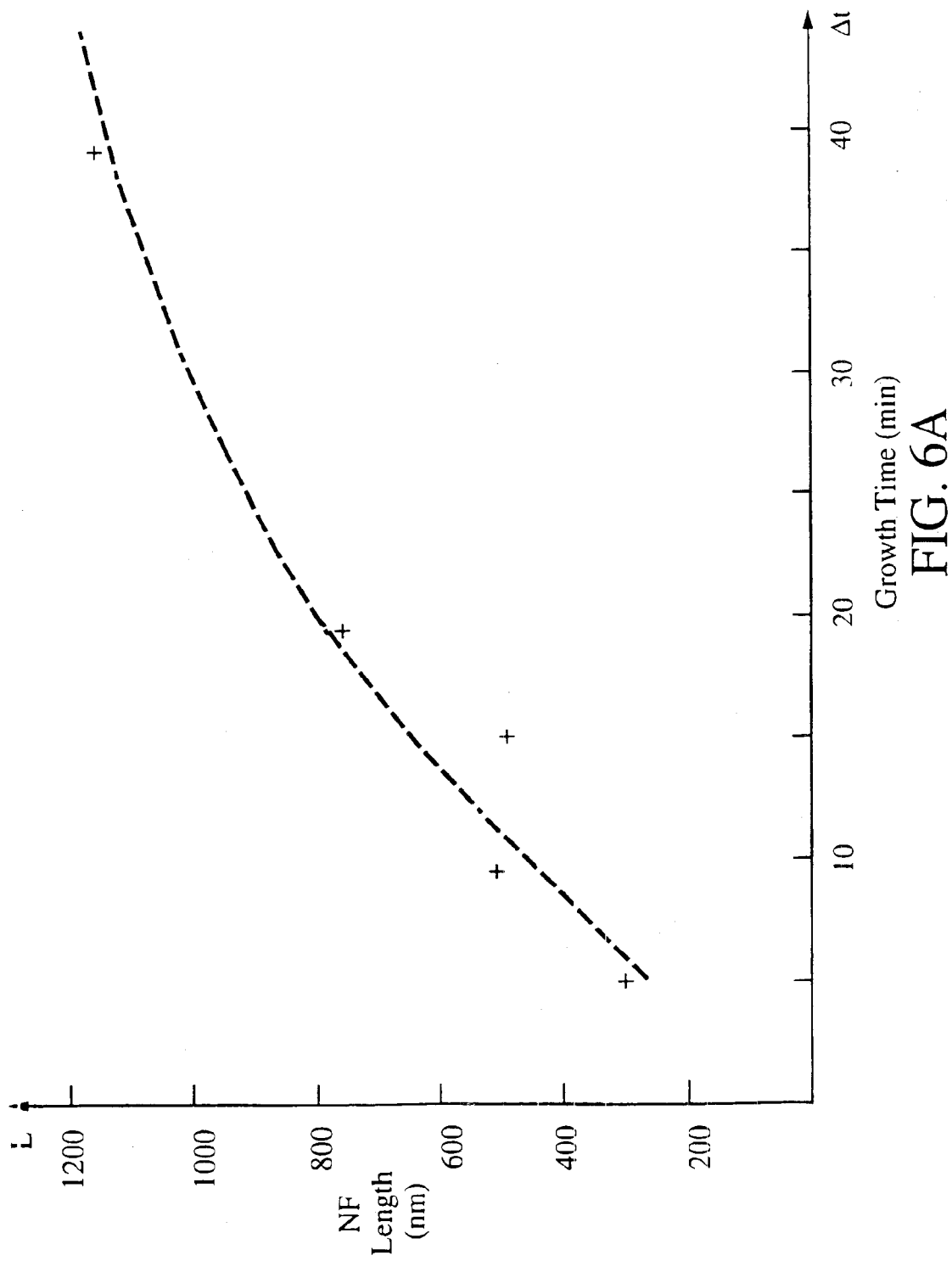
FIGS. 6A–6B graphically illustrate growth in length with time of an NF and an MWNT.
Figure 6B:
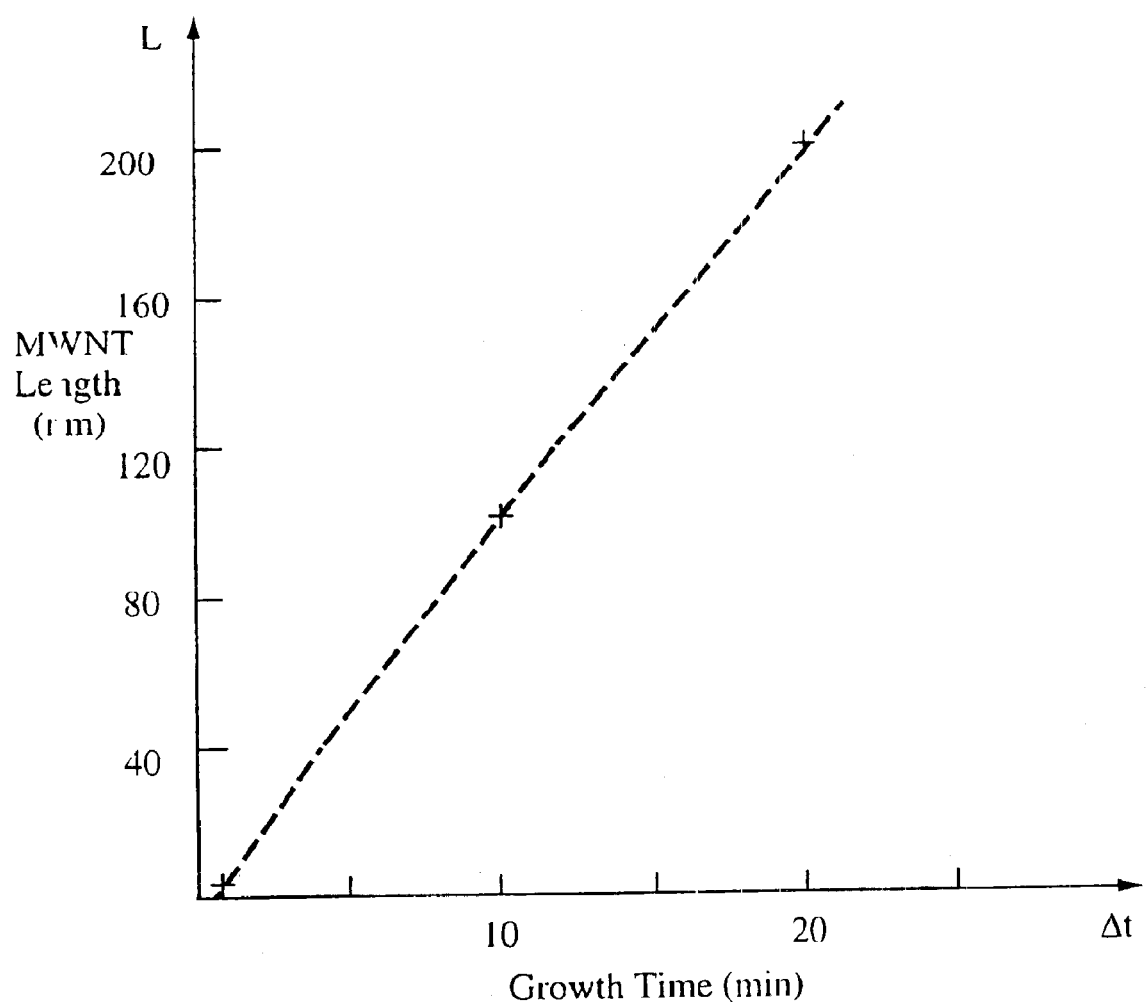

An MWNT or NF may be a substantially coaxial assembly of NTs with a diameter depending upon the number of NT layers (e.g., 2–50) that contribute to the MWNT. An MWNT (or NF) with a sufficient number of layers is self-supporting and can provide an carbon nanotube tower with a height that can be seen by an un-aided eye (e.g., 0.1–1 mm). FIGS. 6A and 6B graphically illustrate some measured lengths of different NFs and MWNTs, respectively, as a function of time of growth. Not all NTs grow at the same rate, but FIGS. 6A and 6B indicate that the NT length increases approximately as $t^\alpha$ with $\alpha$<1 (characteristic of a diffusion process) over relatively long time periods. An Ni catalyst appears to provide more uniform growth of an MWNT than does an Fe catalyst.

A nanofiber (NF) has a substantially non-hollow core of graphitic carbon and is configured in one mode as a sequence of similar truncated cones of graphitic C that fit together in a substantially coaxial pattern resembling an MWNT. Typically, an NF has a cone angle of 10°–90°, has a diameter of 15–200 nm and may reach a maximum height of tens to hundreds of microns or more. The feed gas used to generate an NF is typically $CH_4$, $C_2H_4$ or $C_2H_2$ in an appropriate temperature range.

Figure 7:
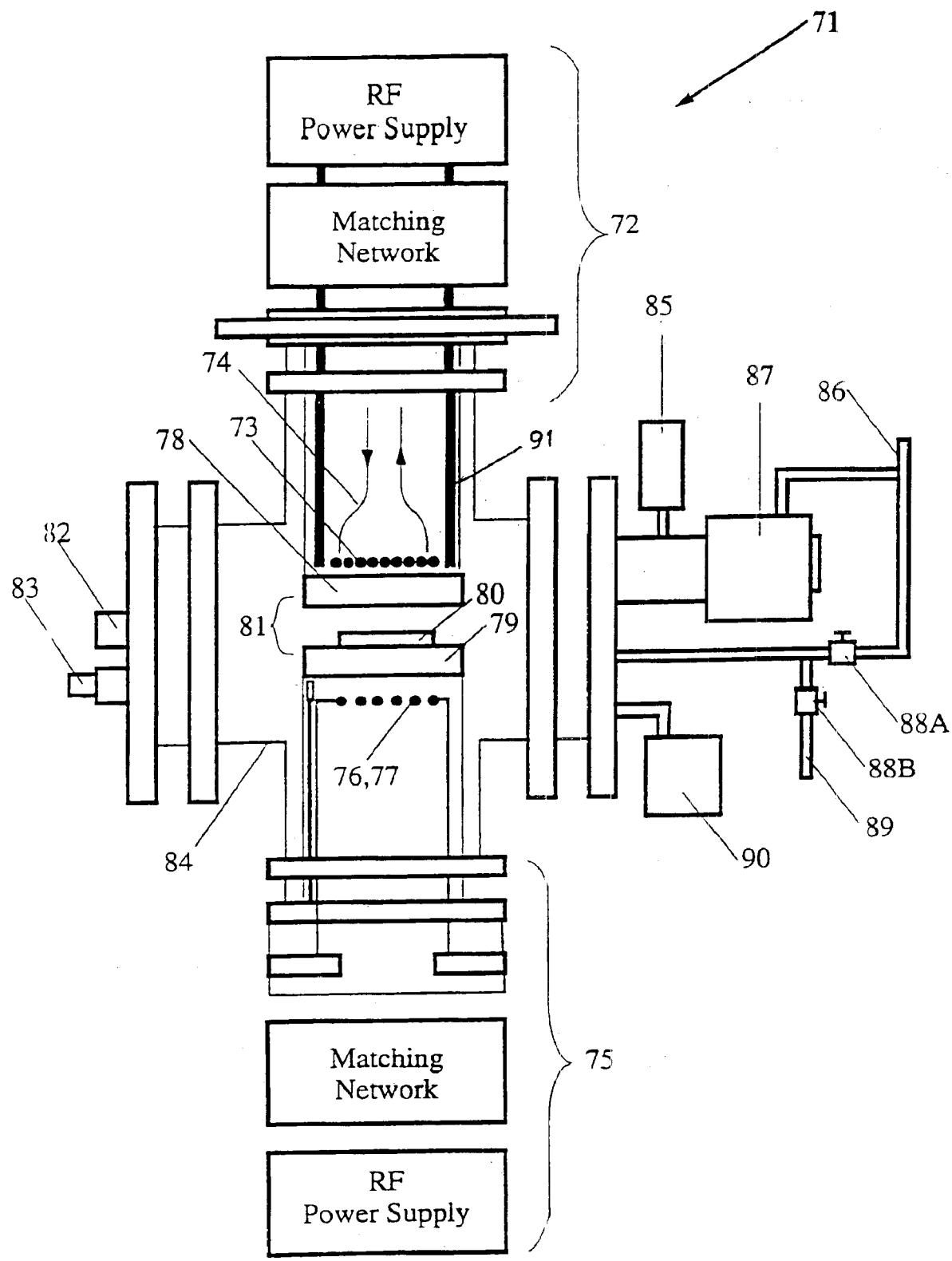
FIG. 7 illustrates plasma reactor apparatus suitable for growth of NTs.
Figure 8A:
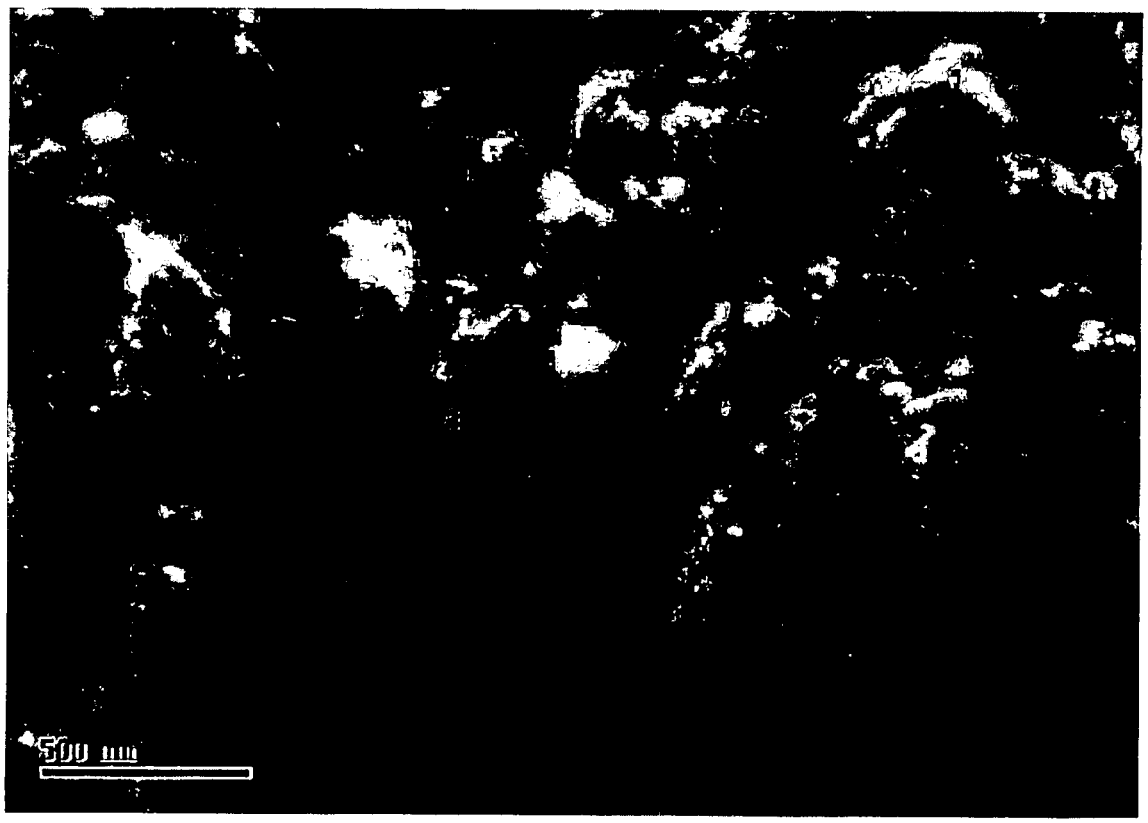
FIGS. 8A–8D are photomicrographs illustrating the effects of use of different capacitive power levels on growth of NTs and NFs.
Figure 8B:
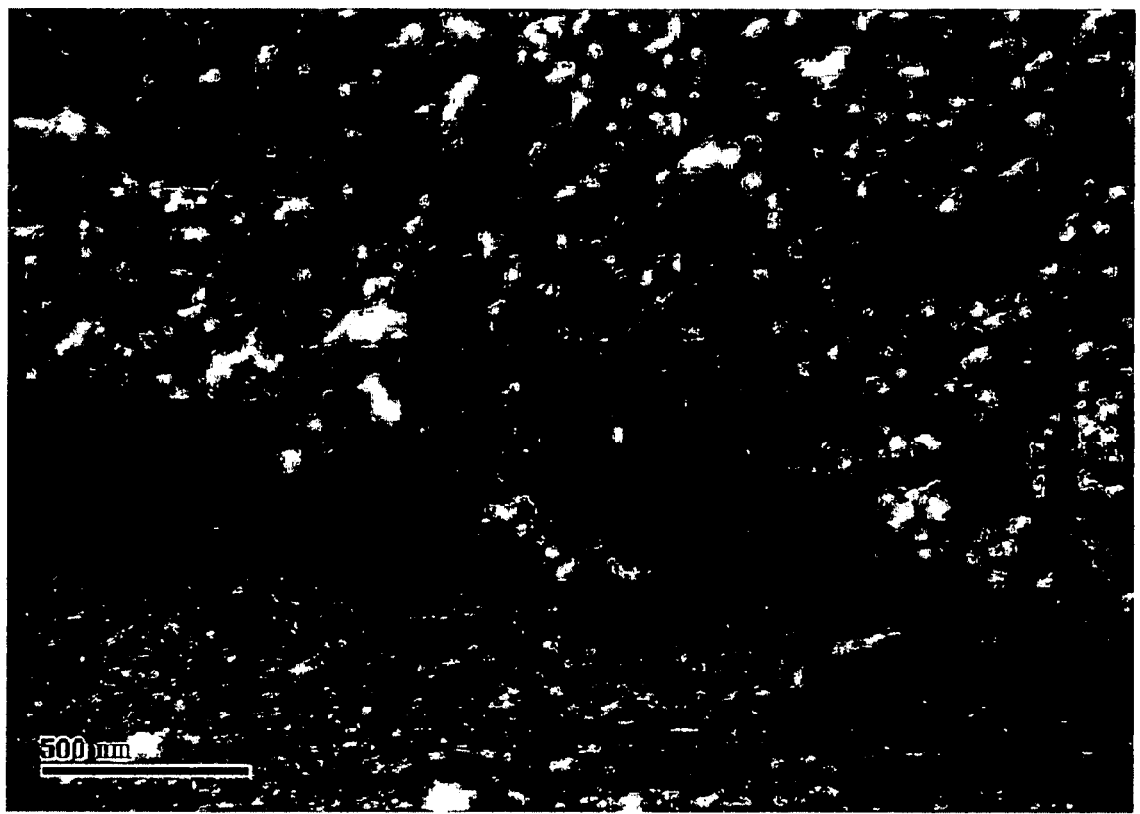
Figure 8C:
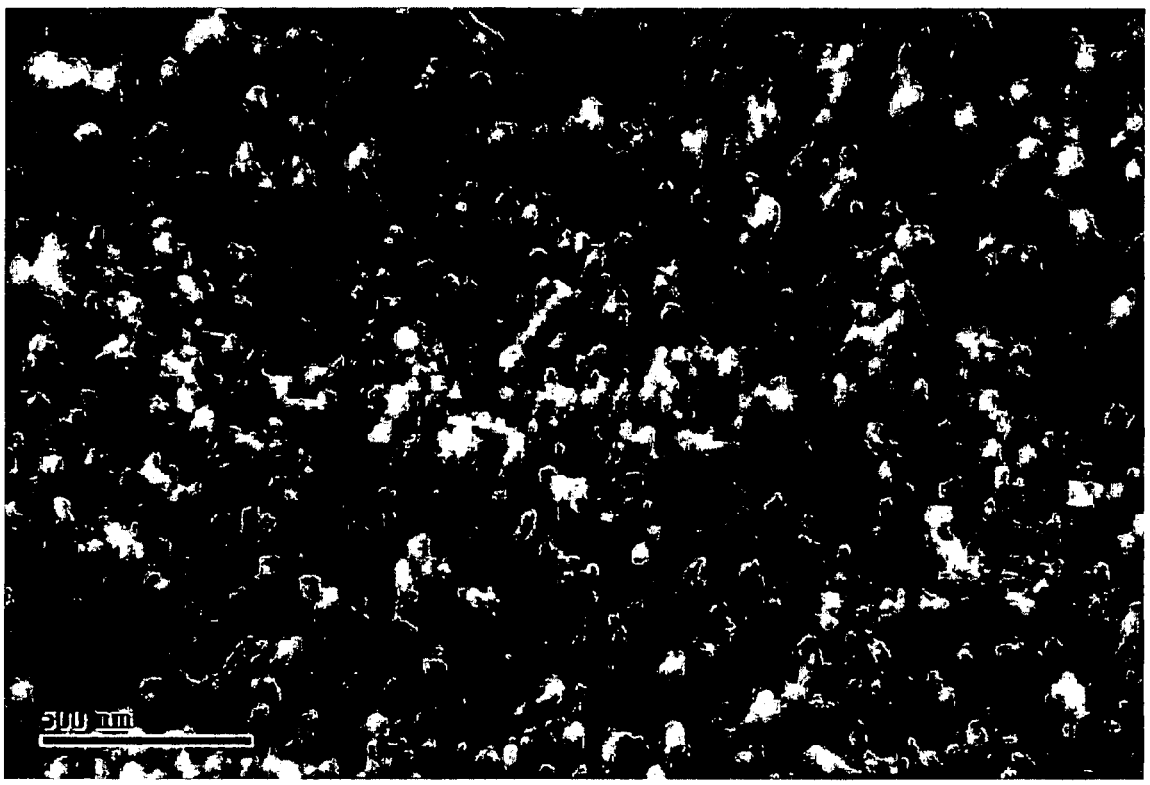
Figure 8D:
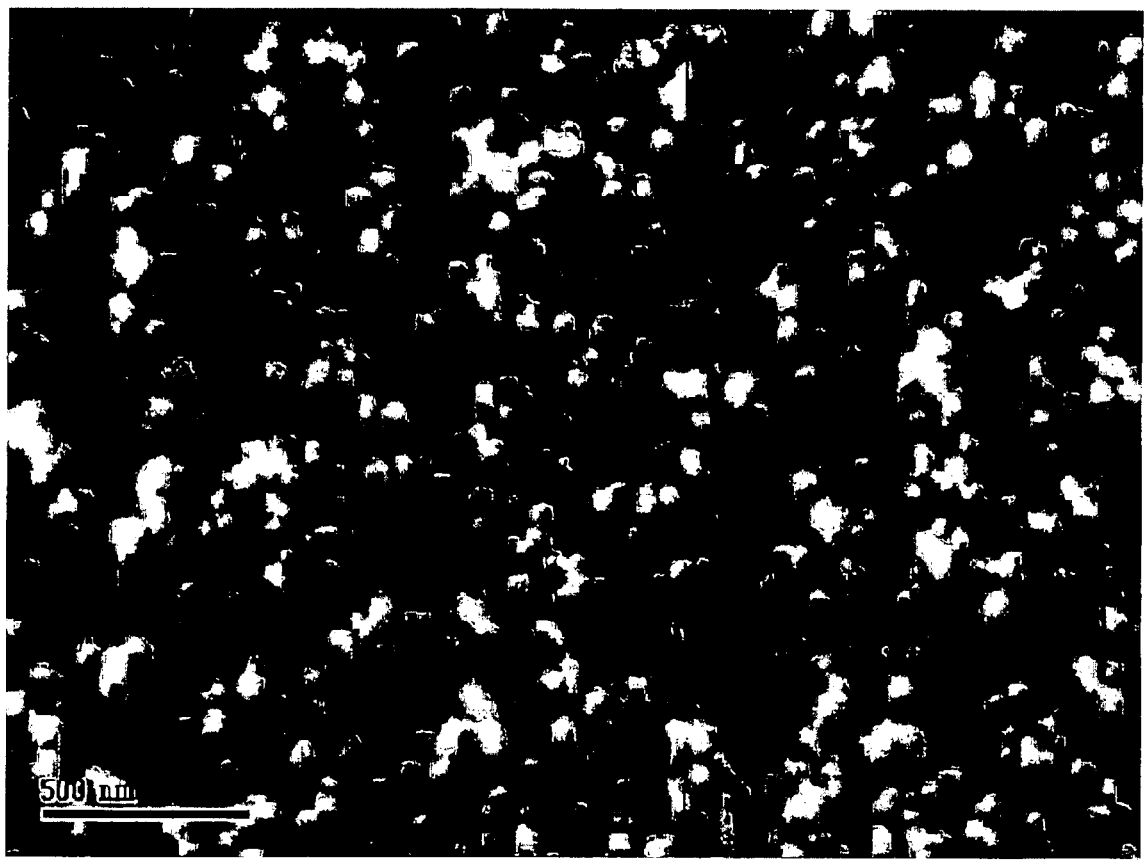

The plasma discharge system 71 in FIG. 7 includes a first power supply and matching network 72, which provides inductive power through a coil 73 (first electrode) and associated current line 74, and a second power supply and matching network 75, which provides capacitive power through the substrate stage (second electrode 79). First and second electrodes, 73 and 79, are connected to the respective first and second power supplies, 72 and 75. The structure 80 on which the NFs are grown rests on the second electrode 79, which is spaced apart from the first electrode 73 to provide a gap region 81 in which the plasma is formed and the carbon nanotubes are grown.

The structure 80 is placed in position between the electrodes, 73 and 79, using a structure loading slot 82, and an appropriate feed gas (e.g., $CH_4$ or $C_2H_4$ or $C_2H_2$) is admitted into a reaction chamber 84 through a feed gas inlet 83. Pressure gauges, 85 and 90, measure the pressure in the plasma discharge chamber, which is pumped through the chamber 84 using a pump 86 controlled by a valve 87 and/or a first metering valve 88A. A backfill mechanism 89 provides an inert gas (e.g., Ar or Xe) that is metered by a second metering valve 88B.

In one mode of operation, the first electrode 73 includes a six-turn copper coil 73 that is inductively coupled to the plasma in the gap 81 through a Pyrex or quartz coupling window 78, held on a metal ring 91 that serves as a ground surface for the capacitively coupled second electrode 79. The second electrode 79 is about 6.25 cm in diameter and has a ground shield with a 0.625 cm spacing. The second electrode is heated by a resistive coil heater 77, with temperature monitored and controlled using a thermocouple and thermocontroller. The first and second electrodes, 73 and 79, are powered by separate 13.56 MHz rf generators and matching networks, available from Advanced Energy. Feed gas is fed and controlled by an MKS 1179A mass flow controller. Feed gas pressure is measured using one of two transducers, MKS 722A and MKS 220BA, and is controlled using a manual metering valve.

The plasma initially ignites in the arms of a cross and renders the post-ignition pressure gauge measurements unreliable. In one experiment, a thin layer of Al, followed by a thin layer of Fe, is ion sputtered onto an n-doped silicon substrate. The reaction chamber 84 is continuously flushed with Ar gas (99.999 percent pure) during loading and unloading of the samples. With the substrate in place, the chamber is pumped down to $10^{-5}$ Torr and the substrate is heated to the desired temperature, allowing five minutes for temperature equilibration. A hydrogen-methane mixture is admitted and the chamber is set at the desired value, which may be in a range 0.5–20 mTorr. A nanotube growth time of 10–20 minutes is allowed, and the reactor is cooled to below 300° C. before exposure to air and removal of the sample. Optical emission spectra are collected for the feed gas, indicating the presence of $CH_4$, H and $H_2$, but the presence of species such as $CH_3$ cannot be determined because of strong absorption of the Pyrex glass in the ultraviolet region.

Plasma-enhanced CVD (PECVD) or normal CVD have been used to grow carbon Nts on a two-layer, three-layer or four-layer structure, using various materials for the support layers, and electrical resistances have been measured for these structures. A support structure of Al/Fe/Mo, deposited using sputtering, allows CVD growth of SWNTs having resistance of about 22 kilo-ohms. Table 2 sets for estimated resistances for MWNTs and NFs grown using PECVD to provide the support structure. MWNTs and NFs can be grown using a plasma with or without using the Al/Ir first layer shown in FIG. 1, but SWNTs grown using a plasma may require this first layer.

PECVD can also be used to form SWNTs and MWNTs with a modest number (2–5) of carbon nanotube walls. SWNT growth is normally promoted by using a thinner catalyst layer and higher growth temperatures than the catalyst thicknesses and temperatures used for growth of NFs and MWNTs.

In any plasma discharge, change of the temperature, the pressure, the flow rate(s), the feed gas(es) and feed gas ratios, the method of initiating the plasma, sample pre-treatment, electrical bias, capacitive power, inductive power and/or catalyst will affect the type and quality of carbon nanotubes grown.

TABLE 2

Resistance Associated With PECVD-Grown MWNTs and NFs

| Support Structure | Resistance (Ohms) |
| --- | --- |
| Cr/Fe (MWNT) | 345 |
| Cr/Al/Fe (NF) | 460 |
| Pt/Al/Fe (MWNT) | 70 |
| Ti/Fe (MWNT) | 300 |
| W/Fe (MWNT) | 22,000 |
| W/Fe (NF) | 80 |
| W/Al/Fe (MWNT) | 50 |

TABLE 2-continued

Resistance Associated With PECVD-Grown MWNTs and NFs

| Support Structure | Resistance (Ohms) |
| --- | --- |
| Ni (NF) | ≧2,000 |
| Fe (NF) | 5,000 |

An NF can be grown using a plasma discharge system 71, illustrated in one mode in FIG. 7, at somewhat lower temperatures (T=400–700° C.) with a selected capacitive power for the plasma discharge. Use of a plasma discharge allows use of lower temperatures and promotes vertically oriented carbon nanotube formation. Typically, the carbon nanotubes produced change from MWNTs at low capacitive power to substantially all NFs at higher capacitive power.

An inductive plasma is efficient only at sub-Torr pressures. If the chamber pressure is decreased to a low sub-Torr range, an inductive plasma can be used to grow carbon nanotubes, with a reduction in the concentration of carbon gas in the feed gas.

FIGS. 8A, 8B, 8C and 8D illustrate a transition in the carbon nanotube structure for the respective capacitive power values of 20 W, 30 W, 40 W and 50 W. At 50 W, the carbon nanotubes appear to be substantially all NFs. Changing the inductive power level in the apparatus in FIG. 7 has little or no visible effect on the relative amounts of NTs and NFs grown in a plasma reactor environment.

From the results produced by "scraping" an array of MWNTs from the coated substrate, it appears that the MWNTs are strongly attached to the coated substrate. This attachment may be Ohmic. When the coated substrate is scraped, the MWNT arrays appear to come off as flakes, which is consistent with a base growth pattern, as opposed to a tip growth pattern.

Figure 9A:
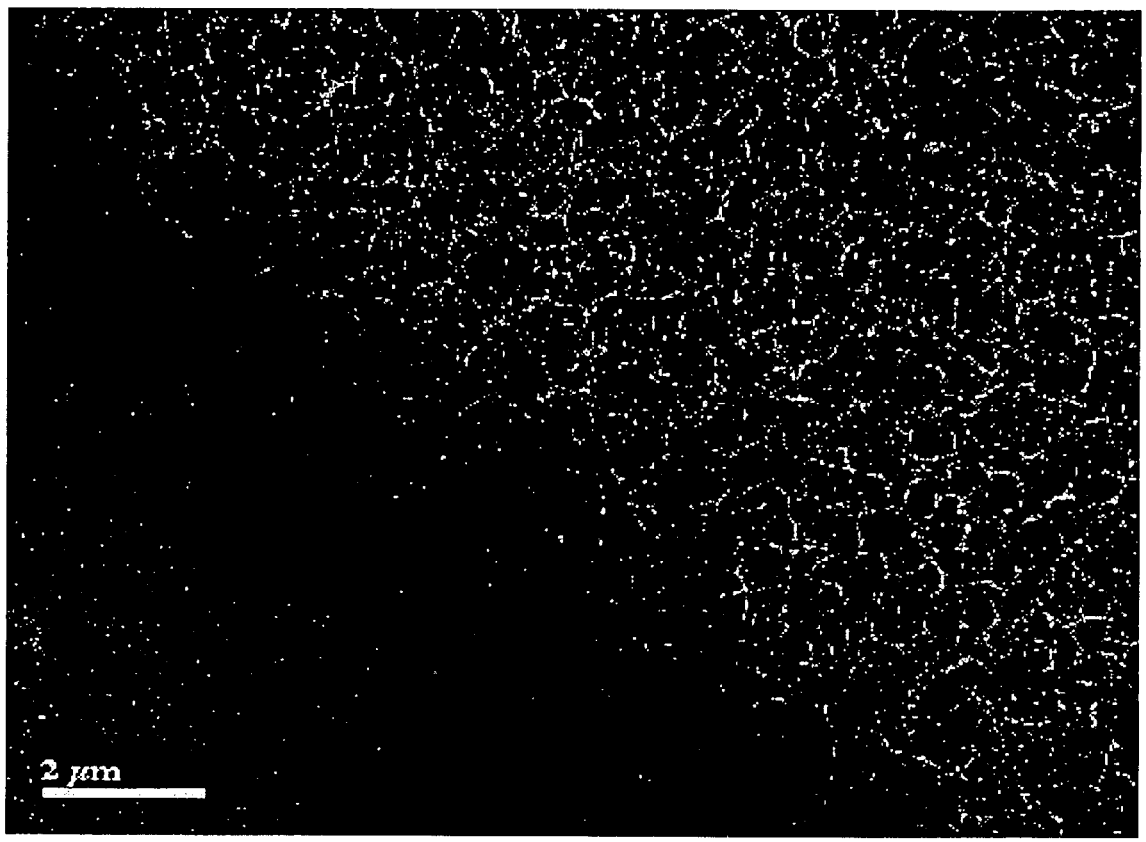
Figure 9B:
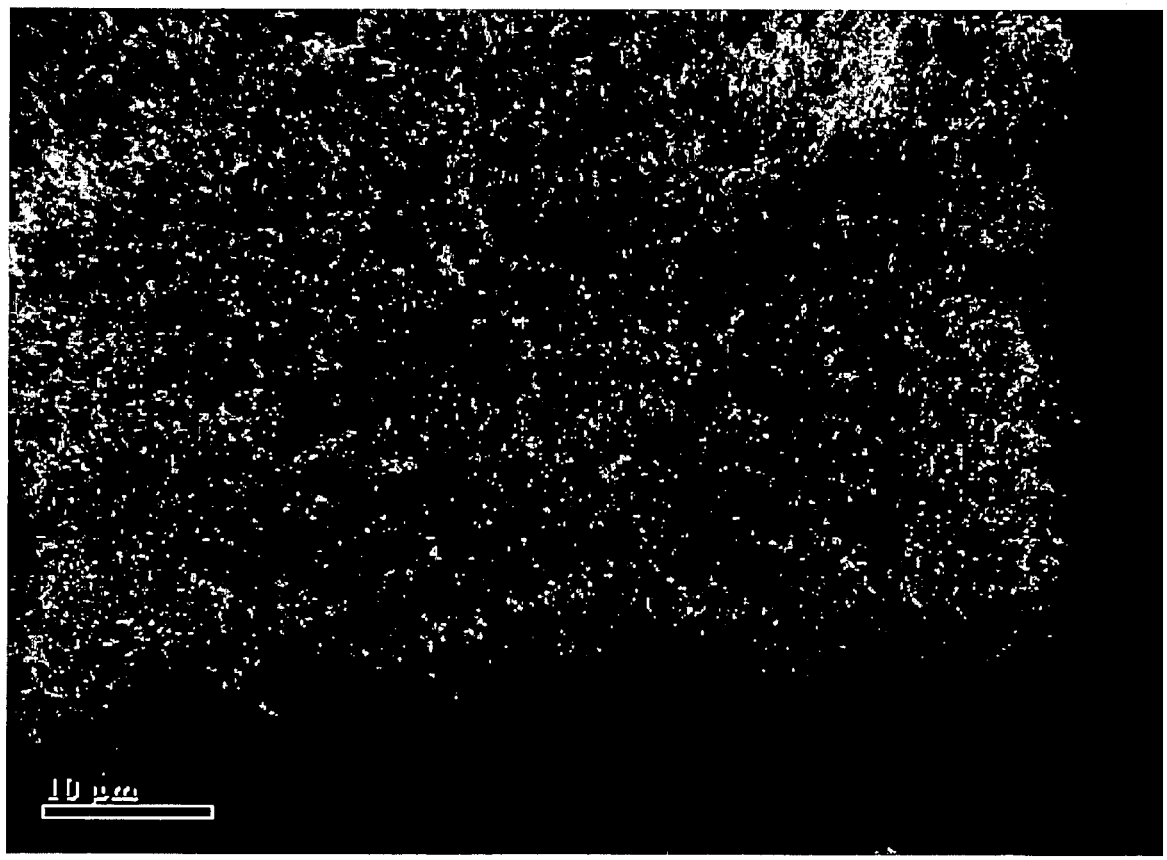
Figure 9C:
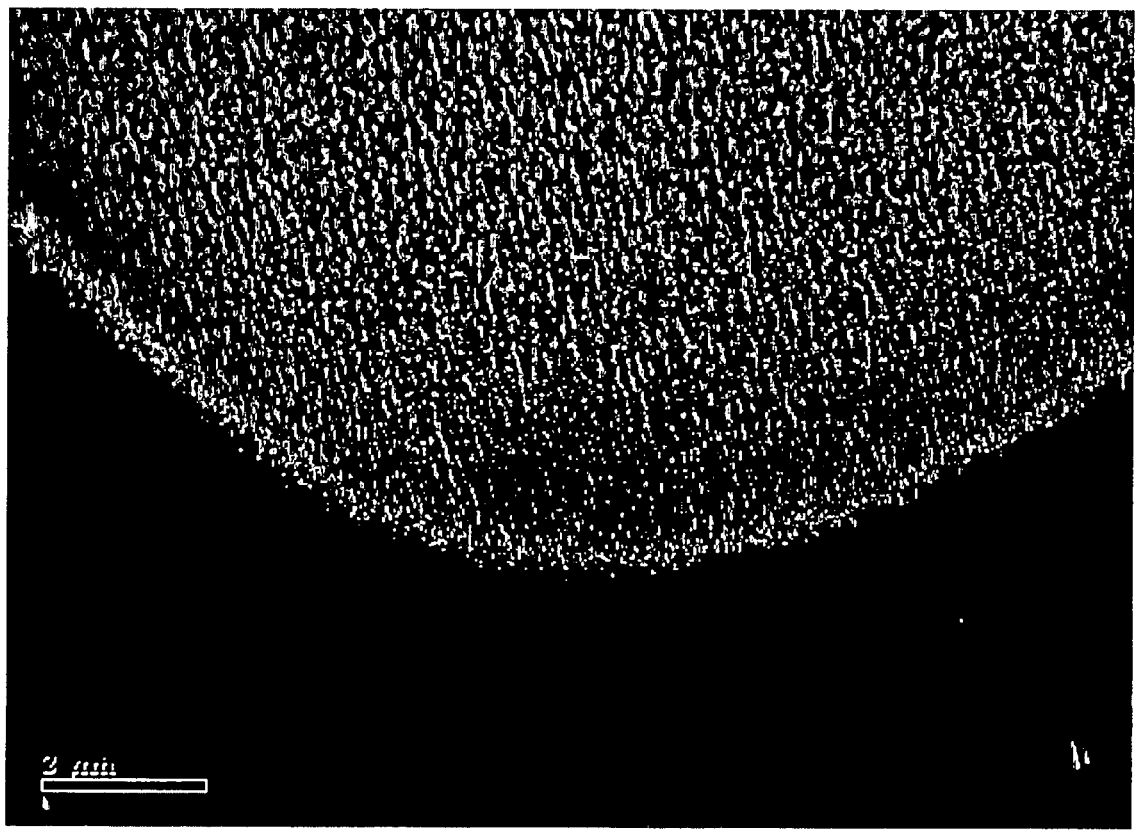

FIGS. 9A, 9B and 9C are photomicrographs showing well defined carbon nanotube growth regions adjacent to mask edges, for an SWNT, and MWNT and an NF, respectively. These images demonstrate that the (exposed) growth regions are more or less uniformly filled with carbon nanotubes and that, at a line between a growth region and a masked region, the concentration of carbon nanotubes changes abruptly from substantially zero in the masked region to a non-zero, approximately uniform value in the growth region.

What is claimed is:

1. A method for producing at least one of a single wall nanotube, a multi-wall nanotube and a nanofiber containing primarily carbon, the method comprising:

providing a substrate of a selected material in a heated chamber, a first layer of a first selected thickness of material that is produced primarily by sputtering a combination of Al and Ir onto the substrate, and a second layer of a second selected thickness of material, drawn from a second group of materials including at least one of Fe, Co and Ni, that is deposited on the first layer that is deposited on the substrate, where at least one of the first layer and the second layer is deposited with a selected non-uniform layer pattern;

providing a hydrocarbon-containing ("HC-containing") gas containing at least one of $CH_4$, $C_2H_4$ and $C_2H_2$, heated to a selected temperature in a mange between 400° C. and 1000° C. within the chamber, and passing the HC-containing gas over a selected portion of the coated substrate; and allowing at least one layer deposited on the substrate to remove H atoms and molecules from the HC-containing gas and to deposit C particles as part of at least one of a single wall nanotube, a multi-wall nanotube and a nanofiber on the coated substrate, in an array defined in part by the selected pattern.

2. The method of claim 1, further comprising producing at least one single wall nanotube having a diameter in a range between 0.5 nm and 5 nm.

3. The method of claim 1, further comprising:

providing, as said HC-containing gas, a gas that is primarily at least one of $C_2H_4$ and $C_2H_2$, heated to a selected temperature in a range $650°\ C. \leq T \leq 900°\ C.$, and allowing said substrate coating layers to remove said H atoms and molecules and to deposit said C particles to form at least one multi-wall nanotube on said coated substrate, in said array defined in part by said selected pattern.

4. The method of claim 1, further comprising producing at least one multi-wall nanotube having a diameter in a range between 2 nm and 100 nm.

5. The method of claim 1, further comprising:

providing as said HC-containing gas a gas that is primarily at least one of $C_2H_4$ and $C_2H_2$, heated by a plasma to a selected temperature in a range $400°\ C. \leq T \leq 600°\ C.$, and allowing said substrate coating layers to remove said H atoms and molecules and to deposit said C particles to form at least one nanofiber on said coated substrate, in said array defined in part by said selected pattern.

6. The method of claim 1, further comprising producing at least one nanofiber having a diameter in a range between 15 nm and 200 nm.

7. The method of claim 1, further comprising:

providing, as said HC-containing gas, a gas that is primarily $CH_4$, heated in a plasma to a selected temperature in a range $800°\ C. \leq T \leq 1100°\ C.$, and allowing said substrate coating layers to remove said H atoms and molecules and to deposit said C particles to form at least one single wall nanotube on said coated substrate, in said array defined in part by said selected pattern.

8. The method of claim 7, further comprising producing at least one single wall nanotube having a diameter in a range between 0.5 nm and 5 nm.

9. The method of claim 1, further comprising:

providing as said HC-containing gas a gas that is primarily at least one of $C_2H_4$ and $C_2H_2$, heated in a plasma to a selected temperature in a range $650° \leq T \leq 900°\ C.$, and allowing said substrate coating layers to remove said H atoms and molecules and to deposit said C particles to form at least one multi-wall nanotube on said coated substrate, in said array defined in part by said selected pattern.

10. The method of claim 9, further comprising producing at least one multi-wall nanotube having a diameter in a range between 2 nm and 100 nm.

11. The method of claim 1, further comprising depositing said second layer pattern using a second layer mask having at least one aperture.

12. The method of claim 11, further comprising selecting said second layer pattern from a group of aperture patterns consisting of at least one polygon, at least one alphanumeric character, a spiral, two or more selected sectors of an oval, an irregular boundary having at least one linear segment, and an irregular boundary having at least one curvilinear segment.

13. The method of claim 1, further comprising providing said second substrate coating with said second thickness in a range between 0.1 nm and 20 nm.

14. The method of claim 1, further comprising providing said second substrate coating primarily by sputtering of a target containing at least one of Fe, Co and Ni.

15. The method of claim 1, further comprising providing said second substrate coating primarily by sputtering of a target containing at least two of Fe, Co and Ni.

16. The method of claim 1 further comprising depositing said first layer pattern using a first layer mask having at least one aperture.

17. The method of claim 16, further comprising selecting said first layer pattern from a group of aperture patterns consisting of at least one polygon, at least one alphanumeric character, a spiral, one or more selected sectors of an oval, an irregular boundary having at least one linear segment, and an irregular boundary having at least one curvilinear segment.

18. The method of claim 1, further comprising providing said first substrate coating with said first thickness in a range between 0.1 nm and 20 nm.

19. The method of claim 1, further comprising providing said first substrate coating primarily by at least one of ion beam sputtering, arc discharge, laser ablation, chemical vapor deposition and evaporation of a target containing at least one of Al and Ir.

20. The method of claim 1, further comprising including in an exposed layer a selected amount of Mo.

21. The method of claim 1, further comprising selecting said substrate material from a group of substrate materials consisting of highly oriented pyrolytic graphite (HOPG), amorphous carbon, fused quartz, glass, zeolite and mica.

* * * * *

UNITED STATES PATENT AND TRADEMARK OFFICE
CERTIFICATE OF CORRECTION

PATENT NO. : 6,858,197 B1  Page 1 of 1
DATED : February 22, 2005
INVENTOR(S) : Lance D. Delzeit It is certified that error appears in the above-identified patent and that said Letters Patent is hereby corrected as shown below:

<u>Title page,</u>
Item [75], "Inventor: Lance D. Delzeit, Sunnyvale, CA (US)" should be
-- Inventors: Lance D. Delzeit, Sunnyvale (US) and Meyya Meyyappan, San Jose, CA (US) --.

Signed and Sealed this

Twenty-first Day of March, 2006

JON W. DUDAS
*Director of the United States Patent and Trademark Office*